(12) United States Patent
Broos et al.

(10) Patent No.: US 9,024,723 B2
(45) Date of Patent: May 5, 2015

(54) METHOD AND APPARATUS FOR CROSS-MEDIA USE OF RFID READERS AND RFID TAGS

(75) Inventors: Rudi Constantinus Broos, Essen (BE); Toon Coppens, Lier (BE); Lieven Leopold Albertine Trappeniers, Herentals (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1878 days.

(21) Appl. No.: 12/201,102

(22) Filed: Aug. 29, 2008

(65) Prior Publication Data
US 2010/0052855 A1 Mar. 4, 2010

(51) Int. Cl.
*H04Q 5/22* (2006.01)
*H04Q 9/00* (2006.01)

(52) U.S. Cl.
CPC ............. *H04Q 9/00* (2013.01); *H04Q 2209/20* (2013.01); *H04Q 2209/47* (2013.01)

(58) Field of Classification Search
USPC ........................................................ 340/10.1
See application file for complete search history.

(56) References Cited

U.S. PATENT DOCUMENTS

| 7,701,341 | B2 * | 4/2010 | Kumar et al. ............... 340/572.1 |
| 2006/0186998 | A1 * | 8/2006 | Lin et al. ..................... 340/10.41 |
| 2007/0250901 | A1 * | 10/2007 | McIntire et al. ............... 725/146 |
| 2008/0149702 | A1 * | 6/2008 | Trappeniers et al. ......... 235/375 |
| 2008/0275763 | A1 * | 11/2008 | Tran et al. ........................ 705/10 |
| 2009/0019061 | A1 * | 1/2009 | Scannell, Jr. .................... 707/10 |

* cited by examiner

*Primary Examiner* — George Bugg
*Assistant Examiner* — Anthony D Afrifa-Kyei
(74) *Attorney, Agent, or Firm* — Wall & Tong LLP (57) ABSTRACT

The invention includes a method and apparatus for facilitating cross-media use of object codes and object code readers, such as RFID tags and readers, barcode codes and readers, and the like. In one embodiment, a method includes receiving an object code read request from a user device where the object code read request indicates that an object has been read using an object code reader, determining at least one of a provider of the object code read using the object code reader and a provider of the object code reader used to read the object code, and performing at least one operation in response to the object code read response. The at least one operation performed in response to the object code read response may include one or more of determining an object code read response and determining revenue sharing. In one embodiment, a method includes receiving and storing registration information adapted for use in responding to object code read requests.

23 Claims, 8 Drawing Sheets

| RFID READER IDENTIFIER 511A | RFID READER PROVIDER NAME 511B | RFID READER PROVIDER IDENTIFIER 511C | REGISTERED USER 511D | DATE OF REGISTRATION 511E | LIMITATIONS ON USE 511F |
|---|---|---|---|---|---|
| 45677 | CARREFOUR | 60143 | JOHN SMITH JANE SMITH | JUNE 4, 2007 | NO ADULT CONTENT |
| 30984 | CARREFOUR | 60143 | BOB JONES | FEBRUARY 15, 2005 | NONE |
| ... | ... | ... | ... | ... | ... |
| 37629 | VRT | 67437 | STEVE DAVIS | MAY 18, 2008 | NONE |

FIG. 5A   510   RFID READER REGISTRATION INFORMATION TABLE

| 521A | 521B | 521C | 521D | 521E | 521F | 521G |
|---|---|---|---|---|---|---|
| RFID TAG IDENTIFIER | RFID TAG PROVIDER NAME | RFID TAG PROVIDER IDENTIFIER | REGISTERED USERS | DATE OF REGISTRATION | LIMITATIONS ON USE | BUSINESS LOGIC |
| 11234 | CNN | 60143 | MICHELE BROWN | APRIL 2, 2008 | NONE | - LINK TO WWW.CNN.COM<br>-20c TO SERVICE PROVIDER |
| 11235 | CNN | 60143 | BRIAN JOHNSON | OCTOBER 9, 2006 | NONE | - LINK TO WWW.CNN.COM<br>-10c TO SERVICE PROVIDER<br>-10c TO SERVICE PROVIDER |
| ... | ... | ... | ... | ... | ... | ... |
| 11250 | GAP | 67437 | LAUREN WILLIAMS | JULY 10, 2007 | NONE | - PROVIDER CONTENT (GAP.WMV)<br>-25c TO SERVER PROVIDER |

FIG. 5B    520    RFID TAG REGISTRATION INFORMATION TABLE

| 531A | 531B | 531C | 531D | 531E | 531F | 531G | 531H | 531I |
|---|---|---|---|---|---|---|---|---|
| RFID TAG IDENTIFIER | TAG READ ACTION | RFID TAG PROVIDER IDENTIFIER | TAG READER TOTAL | NUMBER OF READERS | READERS USED | RFID READER PROVIDER SHARE | RFID TAG PROVIDER SHARE | SERVICE PROVIDER SHARE |
| 11234 | LINK WWW.CNN.COM | 60143 | 3 | 2 | 1) 30984 2) 34187 | — | — | 60c |
| 11235 | LINK WWW.CNN.COM | 60143 | 2 | 1 | 1) 31627 | 20c | — | 20c |
| ... | ... | ... | ... | ... | ... | ... | ... | ... |
| 14618 | CONTENT GAP.WMV | 63611 | 114 | 110 | 1) 31684 2) 33849 | 1) Provider 1 50c 2) Provider 2 $1.10 | — | $11.40 |

532₁, 532₂, 532N

TAG READ OPERATION INFORMATION TABLE 530

FIG. 5C

FIG. 6

METHOD AND APPARATUS FOR CROSS-MEDIA USE OF RFID READERS AND RFID TAGS

FIELD OF THE INVENTION

The invention relates to the field of communication networks and, more specifically, to communication networks supporting cross-media advertising using object code capabilities.

BACKGROUND OF THE INVENTION

A cross-media advertising environment using RFID technology does not currently exist. An existing use of RFID technology is known in the domain of logistics and tracking using Electronic Product Code (EPC) capabilities, where EPCglobal Network standards, such as Object Naming Service (ONS), EPC Information Services (EPC-IS), and EPC Discovery Services (EPC-DS), have been developed for purposes of sharing product movement data across multiple trading partners. Disadvantageously, however, this existing use of RFID technology is not suitable for use in a cross-media advertisement environment because the design is neutral, updates are slow, and knowledge regarding the concept of RFID readers is unavailable.

SUMMARY OF THE INVENTION

Various deficiencies in the prior art are addressed by a method and apparatus for facilitating cross-media use of object codes and object code readers, such as RFID tags and readers, barcode codes and readers, and the like. In one embodiment, a method includes receiving an object code read request from a user device where the object code read request indicates that an object has been read using an object code reader, determining at least one of a provider of the object code read using the object code reader and a provider of the object code reader used to read the object code, and performing at least one operation in response to the object code read response. The at least one operation performed in response to the object code read response may include one or more of determining an object code read response and determining revenue sharing. In one embodiment, a method includes receiving and storing registration information adapted for use in responding to object code read requests.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A capability for RFID reader registration, RFID tag registration, and RFID read and response operations is provided. The capabilities depicted and described herein intrinsically stimulate the uptake of RFID readers and the distribution of RFID tags. The capabilities depicted and described herein enable revenue sharing between providers of RFID readers and providers of RFID tags, as well as with any other entities which may be either directly or indirectly involved in supporting use of RFID readers and RFID tags in cross-media advertisement environments and other similar environments in which RFID readers and RFID tags may be used. Thus, the capabilities depicted and described herein provide a reward system that will encourage business entities to distribute more RFID readers and more RFID tags.

Figure 1:
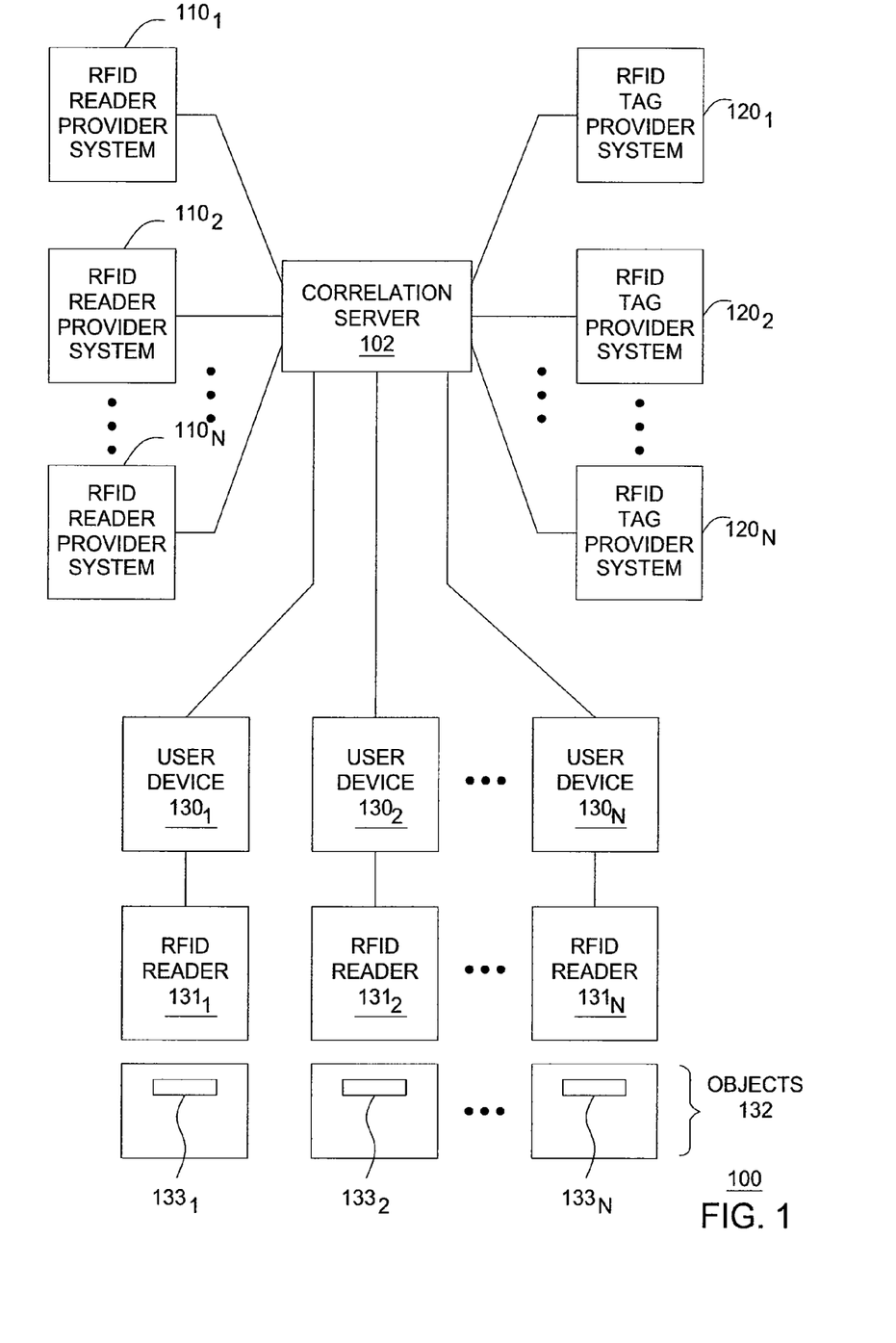
FIG. 1 depicts a high-level block diagram of a communication network.

FIG. 1 depicts a high-level block diagram of a communication network. Specifically, communication network 100 includes a correlation server (CS) 102 adapted to provide various RFID processing functions depicted and described herein. The CS 102 communicates with a plurality of RFID reader provider systems $110_1$-$110_N$ (collectively, RFID reader provider systems 110), a plurality of RFID tag provider systems $120_1$-$120_N$ (collectively, RFID tag provider systems 120), and a plurality of user devices (UDs) $130_1$-$130_N$ (collectively, UDs 130) for providing the RFID correlation functions described herein. The UDs $130_1$-$130_N$ support communications for a plurality of RFID readers (RRs) $131_1$-$131_N$ (collectively, RRs 131).

The RFID reader provider systems 110 include computer systems used by providers of RFID readers to register RFID readers with CS 102. The RFID reader providers may include any companies, organizations, individuals, and the like, which may provide RFID readers to end users for use in reading RFID tags. For example, RFID reader providers may include manufacturers of RFID readers, vendors providing RFID readers, and the like, as well as various combinations thereof. For example, RFID reader providers may include providers of user devices having embedded RFID readers, stores selling RFID reader providers, or any other entities which may provide RFID readers. The RFID reader provider systems 110 may communicate with CS 102 in any manner (e.g., using any combination of communication networks, protocols, and the like).

The RFID reader providers register RFID readers with CS 102 using RFID reader provider systems 110. The RFID reader providers register the RFID readers before providing the RFID readers to the end users. The RFID reader providers register RFID readers by providing information associated with the RFID readers (denoted as RFID reader registration information). The RFID reader registration information may be entered via one or more user interfaces of an RFID reader provider system 110, which may then propagate the RFID reader registration information to CS 102 to be stored. The RFID reader registration information may be stored in any manner. In one embodiment, RFID reader registration information is stored in one or more database tables maintained by CS 102 (an example of which is depicted and described herein with respect to FIG. 5).

The RFID reader registration information may include information such as an RFID reader identifier, a name of the RFID reader provider, an identifier of the RFID reader provider, a date of registration of the RFID reader, one or more limitations on use of the RFID reader (e.g., no adult content or any other limitations), and the like, as well as various combinations thereof. The RFID reader registration information may also include other information which may be provided later by the end user of the RFID readers, such as names of the users and like user-specific information.

The RFID tag provider systems 120 include computer systems used by providers of RFID tags to register RFID tags with CS 102. The RFID tag providers may include any companies, organizations, individuals, and the like, which may provide RFID tags to end users for various purposes (e.g., advertising, marketing, informational purposes, and the like). For example, RFID tag providers may include manufacturers of RFID tags, vendors providing RFID tags, and the like, as well as various combinations thereof. For example, RFID tag providers may include providers of products and objects having RFID tags associated therewith. The RFID tag provider systems 120 may communicate with CS 102 in any manner (e.g., using any combination of communication networks, protocols, and the like).

The RFID tag providers register RFID tags with CS 102 using RFID tag provider systems 120. The RFID tag providers register the RFID tags before providing the RFID tags to vendors for association with objects to be made available to users. The RFID tag providers register RFID tags by providing information associated with the RFID tags (denoted as RFID tag registration information). The RFID tag registration information may be entered via one or more user interfaces of an RFID tag provider system 110, which may then propagate the RFID tag registration information to CS 102 to be stored. The RFID tag registration information may be stored in any manner. In one embodiment, RFID tag registration information is stored in one or more database tables maintained by CS 102 (an example of which is depicted and described herein with respect to FIG. 5).

The RFID tag registration information may include information such as an RFID tag identifier, a name of the provider of the RFID tag, an identifier of the provider of the RFID tag, one or more limitations on use of the RFID tag (e.g., no adult content or any other limitations), a date of registration of the RFID tag, business logic associated with the RFID tag (e.g., one or more actions to be performed when the RFID tag is read, revenue sharing rules to be applied when the RFID tag is read, and the like), and the like, as well as various combinations thereof. The RFID reader registration information may also include other information which may be provided later by the end user of the RFID readers, such as names of the users and like user-specific information.

Although primarily depicted and described herein with respect to an embodiment in which RFID reader providers and RFID tag providers are mutually exclusive, in many cases companies, organizations, individuals, and the like may be providers of both RFID readers and RFID tags (and, thus, may be more generally referred to as RFID providers). In such cases, the RFID providers may use one or more systems in order to register the RFID readers and RFID tags.

The UDs 130 include any user devices supporting communications for RRs 131. For example, UDs 130 may include desktop computers, laptop computers, cellular phones, personal data assistants, and the like. The RRs 131 include any RFID readers capable of reading RFID tags. The RRs 131 may communicate with respective UDs 130 in any manner. For example, RRs 131 may plug into UDs 130, may communicate with UDs 130 wirelessly, and the like, as well as various combinations thereof.

Although primarily depicted and described herein with respect to an embodiment in which RRs 131 are separate from the respective UDs 130 supporting communications for RRs 131, in many cases RRs 131 may be integrated within the respective UDs 130 supporting communications for the RRs 131. For example, cellular phones may be equipped with RFID readers. For example, PDAs may be equipped with RFID readers. The RFID readers may be integrated with any other user devices in any manner.

The RRs 131 are used to read RFID tags. An RFID tag is read by bringing the RFID tag within range of an RFID reader. An RFID tag may be embedded in, attached to, or otherwise associated with an object or group of objects (illustratively, objects 132). The objects 132 may include any objects with which RFID tags may be associated. For example, objects 132 may include magazines, newspapers, books, posters, vouchers, clothing, electronics products, CD cases, DVD cases, toys, or any other objects within which RFID tags may be embedded and/or with which RFID tags may be associated. The RFID tags associated with objects $132_1$-$132_N$ are depicted as RFID tags $133_1$-$133_N$ (collectively, RFID tags 133), respectively.

The reading of an RFID tag using an RFID reader may result in one or more actions being performed.

The action(s) performed in response to reading of an RFID tag using an RFID reader may include any actions which may be triggered upon detection that an RFID tag has been read using an RFID reader. For example, in response to reading of an RFID tag using an RFID reader, business logic may indicate that one or more of the following actions are to be performed: the user may be directed to a website where the user can obtain additional information about that object or other related objects, the user may be presented with media content associated with the object or other related objects (e.g., a song clip, a video clip, and the like), and the like, as well as various combinations thereof.

The action(s) performed in response to reading of an RFID tag using an RFID reader may be based on business logic, which may be based on one or more factors. In one embodiment, the action(s) performed in response to the RFID tag being read may be dependent on one or more of the RFID tag read and the RFID reader used to read the tag. In one embodiment, the action(s) performed in response to the RFID tag being read may be dependent on one or more other factors (e.g., the type of user device associated with the RFID reader by which the RFID tag is read, the time at which the RFID tag is read, and the like, as well as various combinations thereof).

The CS 102 performs RFID processing functions, such as registration of RFID readers by RFID reader providers, registration of RFID tags by RFID tag providers, processing RFID tag read messages (e.g., performing one or more actions in response to the RFID tag read message, determining revenue sharing in response to the RFID tag read message, or performing any other similar processing which may be performed for RFID tag read messages), and the like, as well as various combinations thereof. The CS 102 may perform and/or support various other RFID processing functions.

The CS 102 may be operated by one or more providers. For example, CS 102 may be operated by a network equipment provider which designs and manufactures the CS 102. For example, CS 102 may be operated by a telecommunications service provider. For example, CS 102 may be operated by an application service provider. The CS 102 may be operated by various other types of providers. These providers may be referred to herein as RFID service providers (or, more generally, object code service providers) in order to distinguish such providers from RFID reader providers and RFID tag providers.

The CS 102 may be adapted for communicating in various different types of networks supporting different communications technologies, which may depend on the types of networks used by RFID reader provider systems 110, RFID tag provider systems 120, and UDs 130. In one embodiment, CS 102 may be reachable by any devices capable of accessing the Internet.

The RFID processing functions supported by CS 102 may be better understood with respect to FIG. 2-FIG. 6.

Although primarily depicted and described herein with respect to embodiments in which a single correlation server (illustratively, CS 102) provides RFID processing functions, in other embodiments RFID process functions may be performed by multiple correlation servers. In one embodiment, each of the RFID processing functions may be supported by each of the correlation servers. In one embodiment, RFID processing functions may be compartmentalized such that one or more correlation servers are designated for performing each of the different RFID processing functions.

Figure 2:
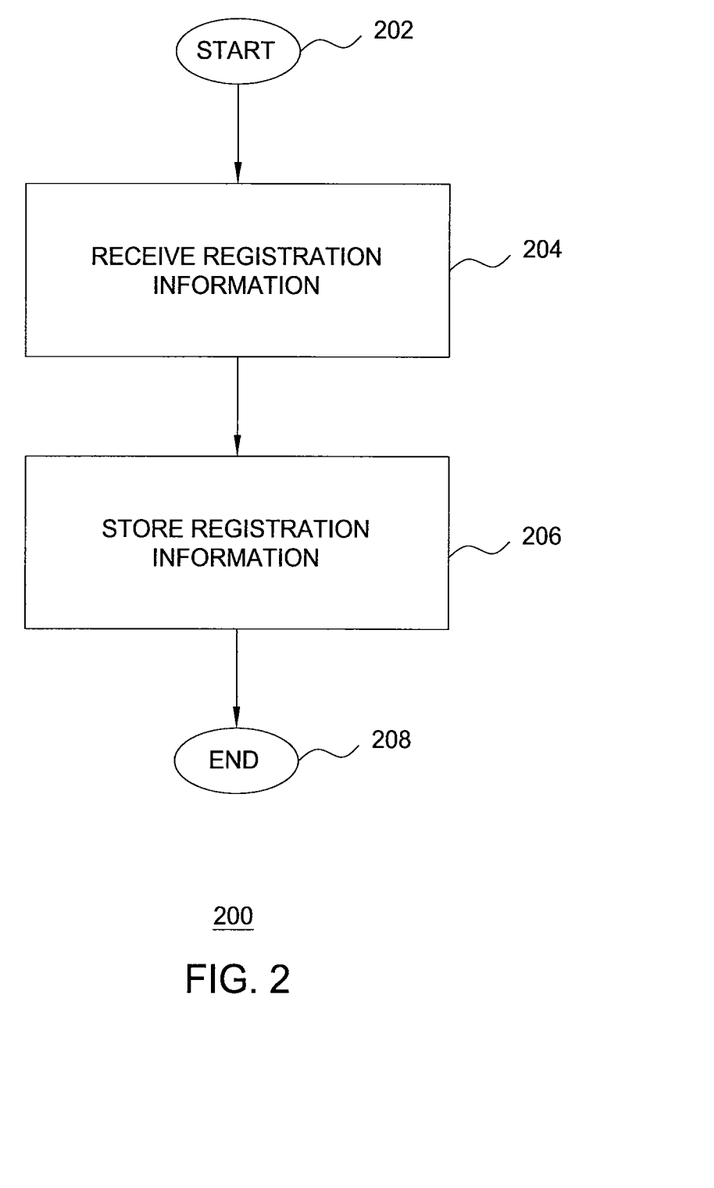
FIG. 2 depicts a method according to one embodiment for storing RFID registration information of RFID readers and RFID tags.

FIG. 2 depicts a method according to one embodiment of the present invention. Specifically, method 200 of FIG. 2 includes a method for storing RFID registration information of RFID readers and RFID tags. Although depicted and described as being performed serially, at least a portion of the steps of method 200 may be performed contemporaneously, or in a different order than depicted and described with respect to FIG. 2. The method 200 begins at step 202 and proceeds to step 204.

At step 204, RFID registration information is received.

The RFID registration information may include registration information associated with an RFID reader. The RFID reader registration information may be received from RFID reader provider systems, user devices (e.g., where users are responsible for registering their own RFID readers), and the like, as well as various combinations thereof. As described herein, the RFID reader registration information may include information such as an RFID reader identifier, a name of the RFID reader, an identifier of the RFID reader provider, one or more users of the RFID reader, a date of registration of the RFID reader, one or more limitations on use of the RFID reader, business logic associated with the RFID reader, and the like, as well as various combinations thereof.

The RFID registration information may include registration information associated with an RFID tag. The RFID tag registration information may be received from RFID tag provider systems, user devices (e.g., where users are responsible for registering their own RFID tags), and the like, as well as various combinations thereof. As described herein, the RFID tag registration information may include information such as an RFID tag identifier, a name of the provider of the RFID tag, an identifier of the provider of the RFID tag, a user owning the RFID tag, a date of registration of the RFID tag, one or more limitations on use of the RFID tag, business logic associated with the RFID tag, and the like, as well as various combinations thereof.

At step 206, the RFID registration information is stored.

The RFID registration information may be stored in any manner. For example, RFID registration information may be stored within a single central correlation server, within one or more of multiple correlation servers where multiple correlation servers are deployed, within one or more remote storage devices which may be accessed by one or more correlation servers, and the like, as well as various combinations thereof).

Figure 5A:
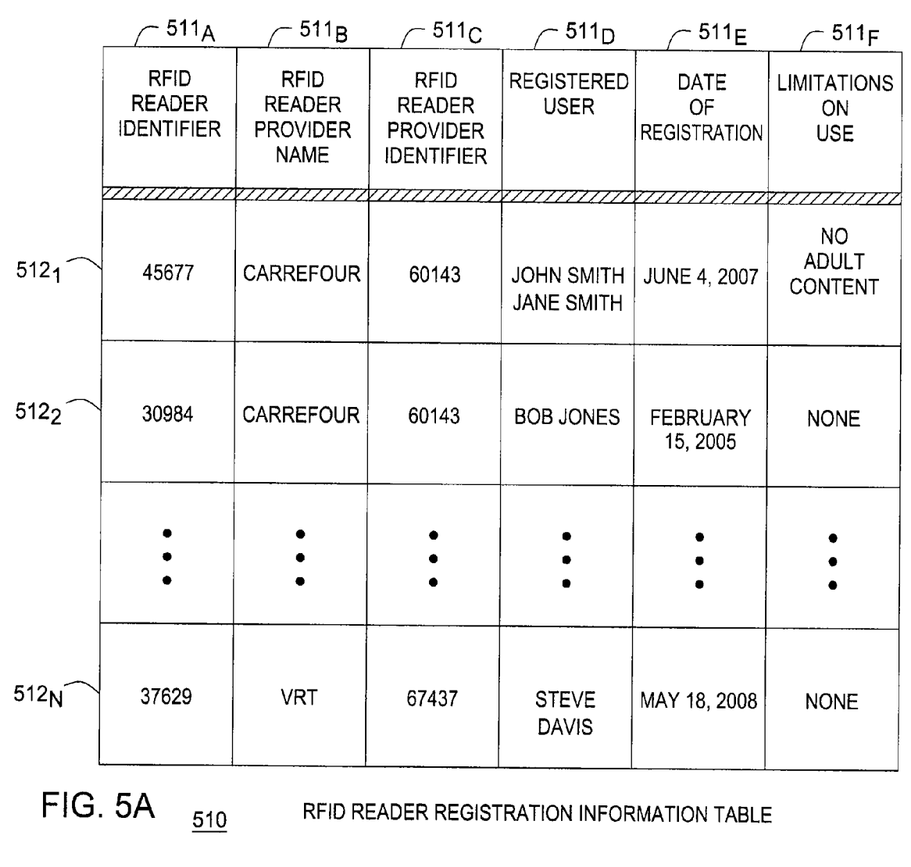
FIGS. 5A-5C depict exemplary database tables for storing RFID registration information, initiating business logic and determining revenue sharing in response to an RFID tag being read by an RFID reader, and maintaining information associated with reading of RFID tags by RFID readers.
Figure 5B:
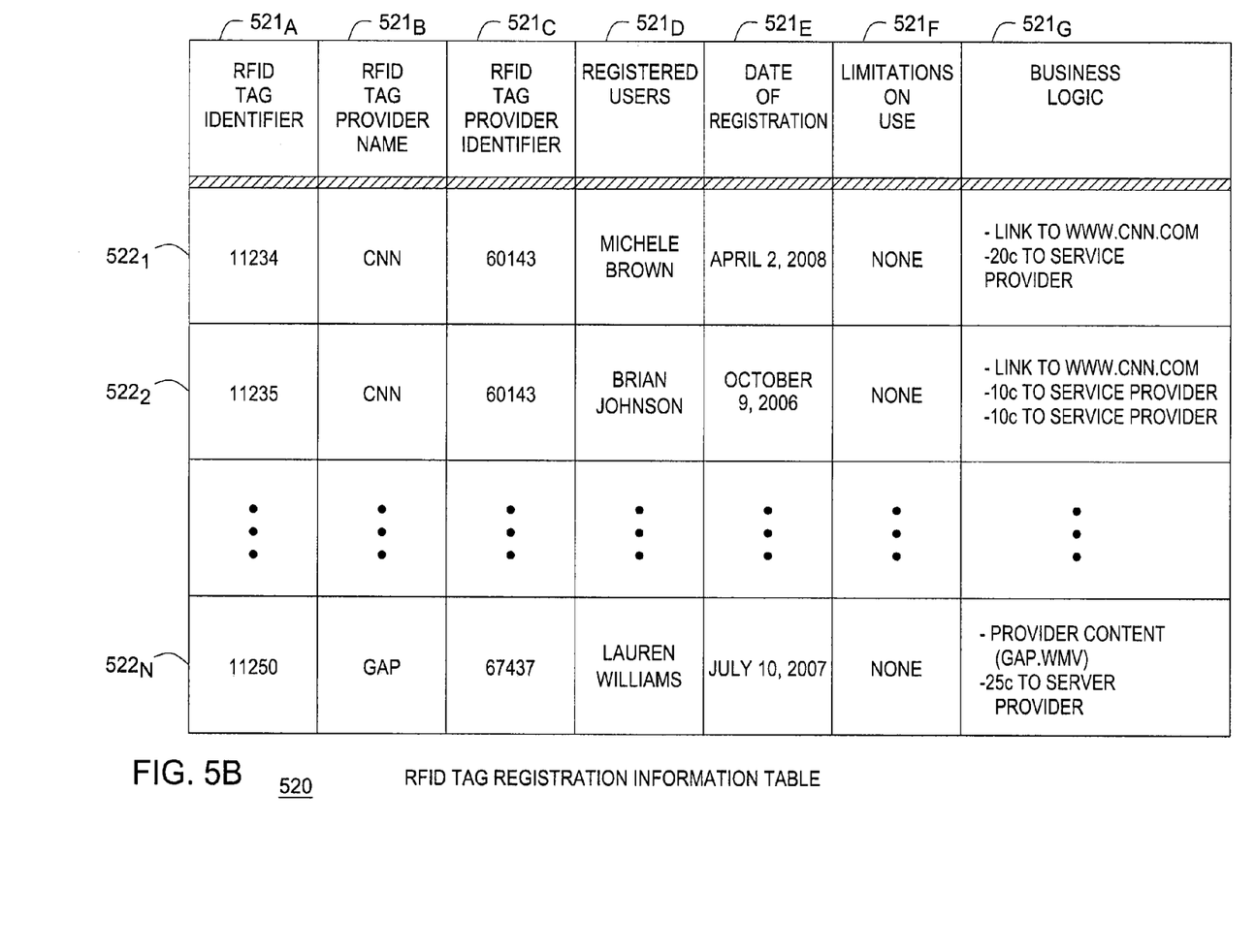

The RFID registration information may be stored in any format. In one embodiment, RFID reader registration information and RFID tag registration information may be stored in a single database table. In one embodiment, RFID reader registration information may be stored in a first database table and RFID tag registration information may be stored in a second database table. An example of this embodiment is depicted in FIG. 5, which depicts an exemplary RFID reader registration information table (in FIG. 5A) and an exemplary RFID tag registration information table (in FIG. 5B).

At step 208, method 200 ends. Although depicted and described as ending (for purposes of clarity), method 200 of FIG. 2 may continue to be performed as RFID registration information continues to be received from RFID reader providers and RFID tag providers.

Figure 3:
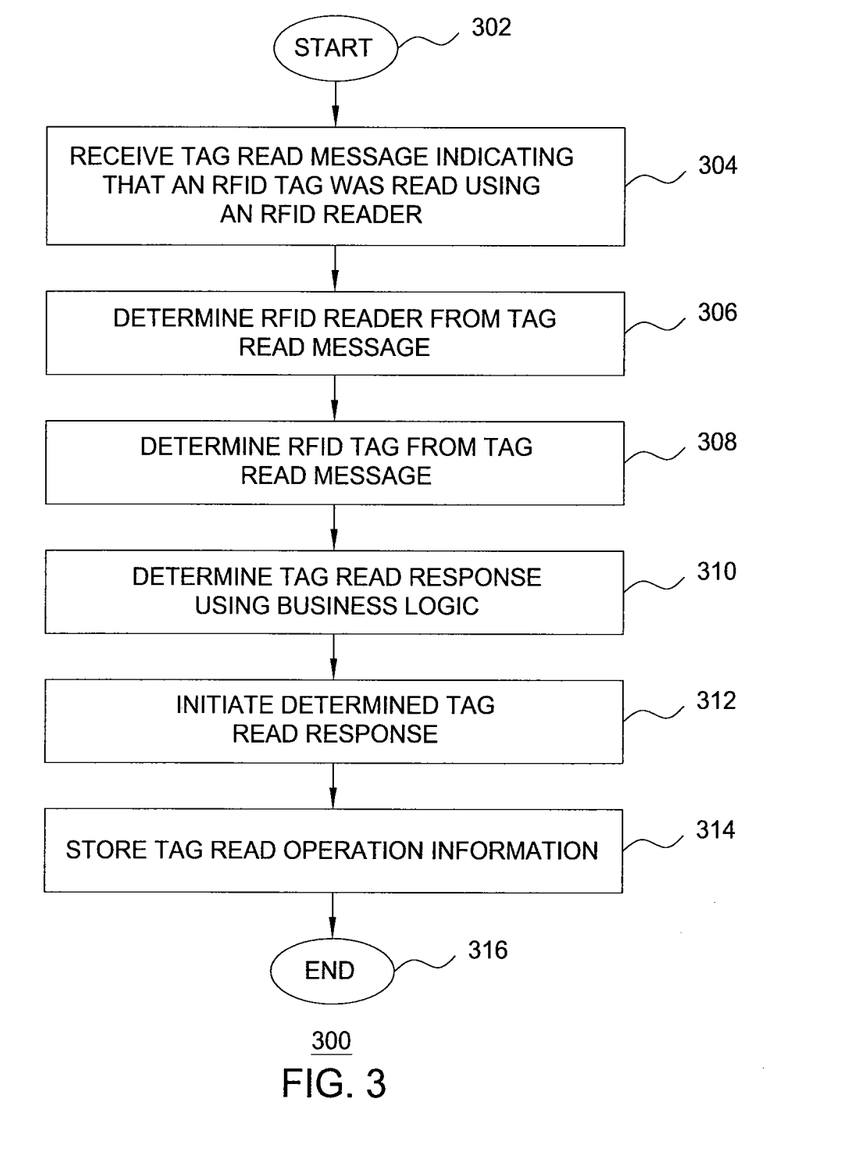
FIG. 3 depicts a method according to one embodiment for initiating business logic in response to an RFID tag being read by an RFID reader.

FIG. 3 depicts a method according to one embodiment of the present invention. Specifically, method 300 of FIG. 3 includes a method for initiating a tag read response in response to an RFID tag being read by an RFID reader. Although depicted and described as being performed serially, at least a portion of the steps of method 300 may be performed contemporaneously, or in a different order than depicted and described with respect to FIG. 3. The method 300 begins at step 302 and proceeds to step 304.

At step 304, a tag read message is received. The tag read message indicates that an RFID tag was read using an RFID reader.

At step 306, the RFID reader used to read the RFID tag is determined from the tag read message. For example, the tag read message may include an RFID reader identifier of the RFID reader.

At step 308, the RFID tag that was read is determined from the tag read message. For example, the tag read message may include an RFID tag identifier of the RFID tag.

At step 310, a tag read response to the tag read request is determined. The tag read response is determined using business logic. The business logic may specify the tag read response based on one or more factors. The tag read response may be determined using information stored in one or more database tables. An exemplary table which may be used to determine a tag read response is depicted and described herein with respect to FIG. 5B.

The tag read response may be based on one or both of the RFID tag that was read and the RFID reader used to read the RFID tag. The tag read response may also be based on one or more other factors, such as the type of user device with which the RFID reader is associated (e.g., which may provide an indication as to the capabilities of the user device to receive and present certain types of content), time-based factors (e.g., the time of day, time of year, and so forth), and the like, as well as various combinations thereof.

The tag read response may include one or more tag read actions to be performed in response to the RFID tag being read. For example, the tag read action(s) may include one or more of directing the user to a website where the user can obtain additional information (e.g., about that object associated with the RFID tag that was read, or other related objects), presenting the user with media content (e.g., associated with the object associated with the RFID tag that was read, associated with the provider of the RFID reader used to read the RFID tag, associated with the provider of the RFID tag that was read, and the like), and the like, as well as various combinations thereof.

At step 312, the determined tag response is initiated. For example, where the business logic indicates that the user should be directed to a website, the address of the website may be propagated to one or more user devices associated with the user. For example, where business logic indicates that the user should receive some content, the content may be retrieved and propagated toward one or more user devices associated with the user. As described herein, various other types of responses may be initiated.

At step 314, tag read operation information is stored. The tag read operation information includes any information associated with the tag read operation, where the tag read operation is composed of the combination of the tag read request and tag read response.

The tag read operation information may include any information associated with the tag read request and/or the tag read response. For example, the tag read operations information may include information such as a number of times each RFID tag is read (e.g., a total number, on a per RFID reader basis, and the like), identification of which RFID reader(s) have been used to read each RFID tag, and the like, as well as various combinations thereof. The tag read action information may include other information associated with the tag read operations.

The tag read operation information may be stored in any manner and in any format suitable for storing such information. An exemplary table for storing such tag read operation information is depicted and described herein with respect to FIG. 5C.

At step 316, method 300 ends. Although depicted and described as ending (for purposes of clarity), method 300 of FIG. 3 may continue to be performed as RFID tags continue to be read and RFID tag read responses continue to be provided.

Figure 4:
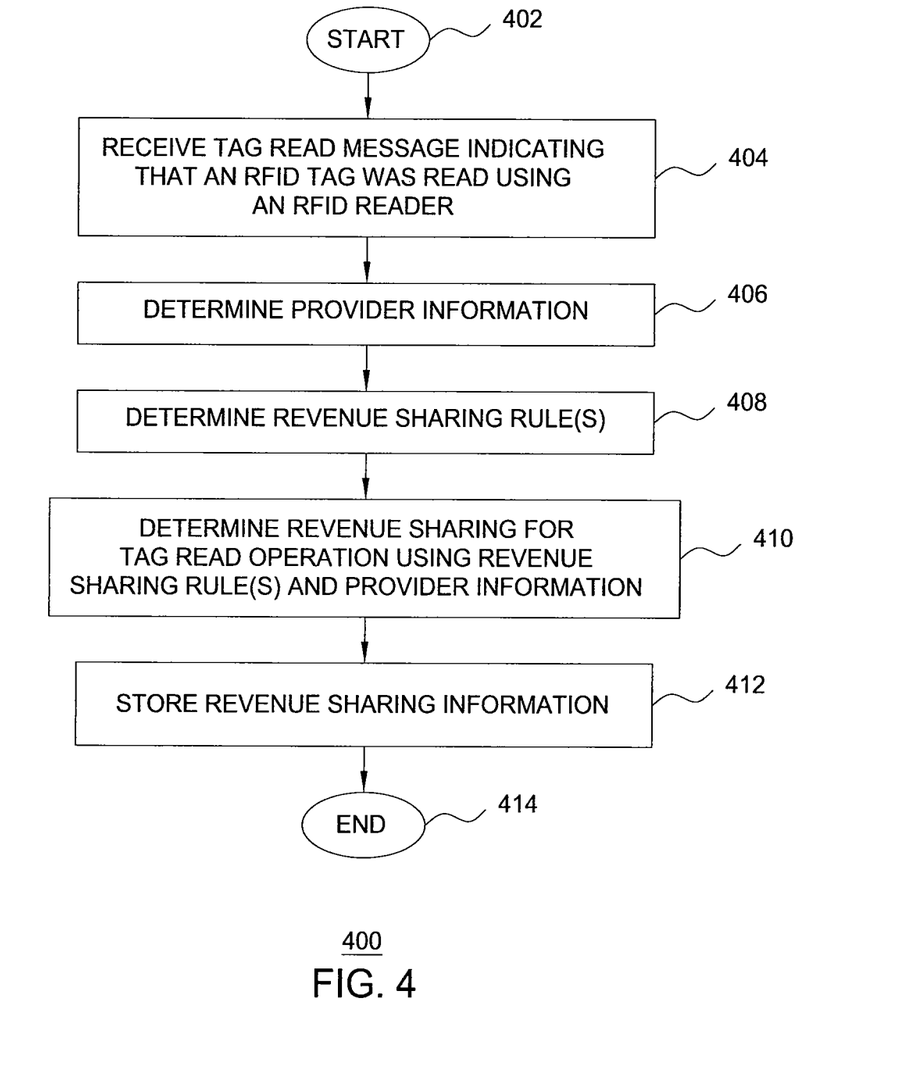
FIG. 4 depicts a method according to one embodiment for determining revenue sharing in response to an RFID tag being read by an RFID reader.

FIG. 4 depicts a method according to one embodiment of the present invention. Specifically, method 400 of FIG. 4 includes a method for determining revenue sharing in response to an RFID tag being read by an RFID reader. Although depicted and described as being performed serially, at least a portion of the steps of method 400 may be performed contemporaneously, or in a different order than depicted and described with respect to FIG. 4. The method 400 begins at step 402 and proceeds to step 404.

At step 404, a tag read message is received. The tag read message indicates that an RFID tag was read using an RFID reader.

At step 406, provider information is determined. The provider information may include one or more of the provider of the RFID reader used to read the RFID tag, the provider of the RFID tag that was read, one or more RFID service providers supporting the tag read operation, and the like.

In one embodiment, any provider information that may be required to determine revenue sharing is determined for each tag read message. In this embodiment, all or a subset of the determined provider information may then be used to determine revenue sharing for the tag read message (e.g., based on business logic associated with the RFID tag, business logic associated with the RFID reader, or any other business logic or rules that may be applied to determine revenue sharing). In another embodiment, only provider information that is required to determine revenue sharing is determined for each tag read message.

The provider information may be determined in any manner.

In one embodiment, for example, the provider of the RFID reader used to read the RFID tag may be included within the tag read message or determined from other information included within the tag read message. For example, the tag read message may include an RFID reader provider identifier associated with the RFID reader, or, alternatively, the tag read message may include an RFID reader identifier of the RFID reader which may be used to determine the associated RFID reader provider identifier (e.g., using the RFID reader registration information table of FIG. 5A).

In one embodiment, for example, the provider of the RFID tag read by the RFID reader may be included within the tag read message or determined from other information included within the tag read message. For example, the tag read message may include an RFID tag provider identifier associated with the RFID tag, or, alternatively, the tag read message may include an RFID tag identifier of the RFID tag which may be used to determine the associated RFID tag provider identifier (e.g., using the RFID tag registration information table of FIG. 5B).

At step 408, a revenue sharing rule(s) is determined for the tag read operation. The revenue sharing rule(s) for the tag read operation indicates the manner in which revenue is to be credited to provider(s) associated with the tag read operation.

The revenue sharing may be between any entity or entities involved in the tag read operation. For example, in response to a tag read message, revenue may be credited to one or more of the provider of the RFID tag read by the RFID reader, the provider of the RFID reader used to read the RFID tag, one or more RFID service providers supporting the RFID tag read service (e.g., one or more network equipment providers, one or more network service providers, or any other similar providers), and the like, as well as various combinations thereof).

In one embodiment, the revenue sharing rules may be independent of the RFID reader, the RFID tag, and any other information specific to the tag read operation. In one such embodiment, the revenue sharing rules may be determined from business logic applicable to all tag read operations.

In one embodiment, the revenue sharing rules may be dependent on one or more of the RFID reader provider associated with the tag read request, the RFID tag provider associated with the tag read request, and one or more RFID service providers. The revenue sharing for the tag read operation also may be based on one or more other factors. The revenue sharing rules used to determine revenue sharing may be specified on a per-tag basis, a per-reader basis, a per-provider basis, and the like, as well as various combinations thereof. For example, revenue sharing rules may be different for different RFID tags. For example, an RFID reader provider may be credited with revenue each time one of its RFID readers is used to read any RFID tag. For example, an RFID service provider may be credited with revenue for each tag read operation serviced by the RFID service provider.

The revenue sharing rules may be determined from any available source of such information. In one embodiment, revenue sharing rules may be determined from information included within the tag read message. In one embodiment, revenue sharing rules may be determined using information stored in one or more database tables (e.g., using business logic or other information stored in one or more of the exemplary database tables depicted and described herein with respect to FIG. 5A and FIG. 5B).

The revenue sharing rules may be negotiated in any manner. In one embodiment, revenue sharing rules may be determined through agreements between business entities and one or more of providers of the RFID readers, providers of the RFID tags, RFID service providers, and the like, as well as various combinations thereof. In one embodiment, revenue sharing rules may be determined through agreements between providers of the RFID readers, providers of the RFID tags, RFID service providers, and the like, as well as various combinations thereof. The revenue sharing rules may be agreed to by any other combinations of entities involved in tag read operations.

For example, where a clothing store includes RFID tags in posters in its store, and reading of the RFID tags in the posters by customers in the store may result in the customers being directed to a website where they may order additional products, the clothing store may agree to provide revenue sharing to the RFID tag provider that provide the RFID tag. Similarly, in continuation of this example, the clothing store may alternatively or additionally agree to provide revenue sharing to the RFID reader providers that provide the RFID readers that enable the customers to read the RFID tags. Similarly, in continuation of this example, the clothing store may alternatively or additionally provide revenue sharing to the RFID service provider(s) that supports the RFID tag read service that can receive and process the tag read request in a manner enabling the customers to reach the website of the clothing store.

The revenue sharing may be implemented in one or more ways. The revenue sharing may be a flat fee credited to an entity (or fees credited to multiple entities) involved in the tag read operation. The revenue sharing may be a percentage of a flat fee amount or some amount of revenue associated with the tag read operation (e.g., where reading of an RFID tag results in information being provided to the user and the user then uses that information to order a product, subscribe to a service, or take some other action that results in generation of revenue). The revenue sharing may be based on various other types of revenue sharing schemes that may or may not depend on whether revenue was actually generated from tag read operations.

The sharing of revenue in response to tag read operations may be better understood with respect to the following examples, although the revenue sharing possibilities should not be interpreted as being limited by such examples because revenue sharing may be performed in various other ways.

For example, revenue sharing rules may indicate that X amount of money should be credited to the RFID reader provider each time its RFID readers are used to read RFID tags.

For example, revenue sharing rules may indicate that, for a particular RFID tag, X amount of money should be credited to the RFID reader provider each time its RFID readers are used to read the RFID tag and Y amount of money should be provided to the RFID tag provider of the RFID tag each time the RFID tag is read.

For example, revenue sharing rules may indicate that, for a particular RFID tag, X amount of money should be credited to an RFID service provider supporting the RFID tag read service each time its server is used to respond to a tag read request (e.g., where Alcatel-Lucent operates the server supporting the tag read functions described herein, providing 20 cents to Alcatel-Lucent each time its server is used to respond to a tag read message).

For example, revenue sharing rules may indicate that X % of a given revenue amount is to be provided to the RFID reader provider, Y % of an a given revenue amount is to be provided to the RFID tag provider, and/or Z % of a given revenue amount is to be provided to an RFID service provider supporting the RFID tag read service. In this example, the given revenue amount may be a flat fee determined based on one or more factors, some amount of revenue generated as a result of or otherwise associated with the tag read operation (e.g., where the user initiating the tag read operation orders a product or subscribes to a service), and the like, as well as various combinations thereof.

The revenue sharing rules may be implemented in various other ways.

At step 410, revenue sharing is determined for the tag read operation. The revenue sharing for the tag read operation is determined using the revenue sharing rules and the provider information. The determined revenue sharing specifies which provider(s) is to be credited with revenue in response to the tag read message and the amount(s) of revenue to be credited to the provider(s).

At step 412, revenue sharing information is stored.

The revenue sharing information may include any information associated with determination of revenue sharing in response to the tag read operation. For example, revenue sharing information may include a cumulative total(s) of revenue generated (e.g., for each provider, for each provider for each RFID tag, for each provider for each RFID reader, and the like, as well as various combinations thereof).

The revenue sharing information may include any other information associated with the revenue sharing determined in response to tag read operations.

The revenue sharing information may be stored in any manner and in any format suitable for storing such information. An exemplary table for storing such revenue sharing information is depicted and described herein with respect to FIG. 5C.

At step 414, method 400 ends. Although depicted and described as ending (for purposes of clarity), method 400 of FIG. 4 may continue to be performed as RFID tags continue to be read and RFID tag responses continue to be provided.

Although primarily depicted and described as independent methods (for purposes of clarity), in one embodiment method 300 of FIG. 3 for initiating business logic in response to an RFID tag being read by an RFID reader and method 400 of FIG. 4 for determining revenue sharing in response to an RFID tag being read by an RFID reader may be implemented as a single process, or at least may be executed in parallel in response to a tag read request being received. In one such embodiment, for example, step 406 may be performed in parallel with method 300 after step 306 is performed, step 408 may be performed in parallel with method 300 after step 308 is performed, and the results of steps 406 and 408 may be used to perform steps 410 and 412 contemporaneous with the remaining steps of method 300. An integrated or contemporaneous execution of methods 300 and 400 may be implemented in other ways.

Figure 5C:
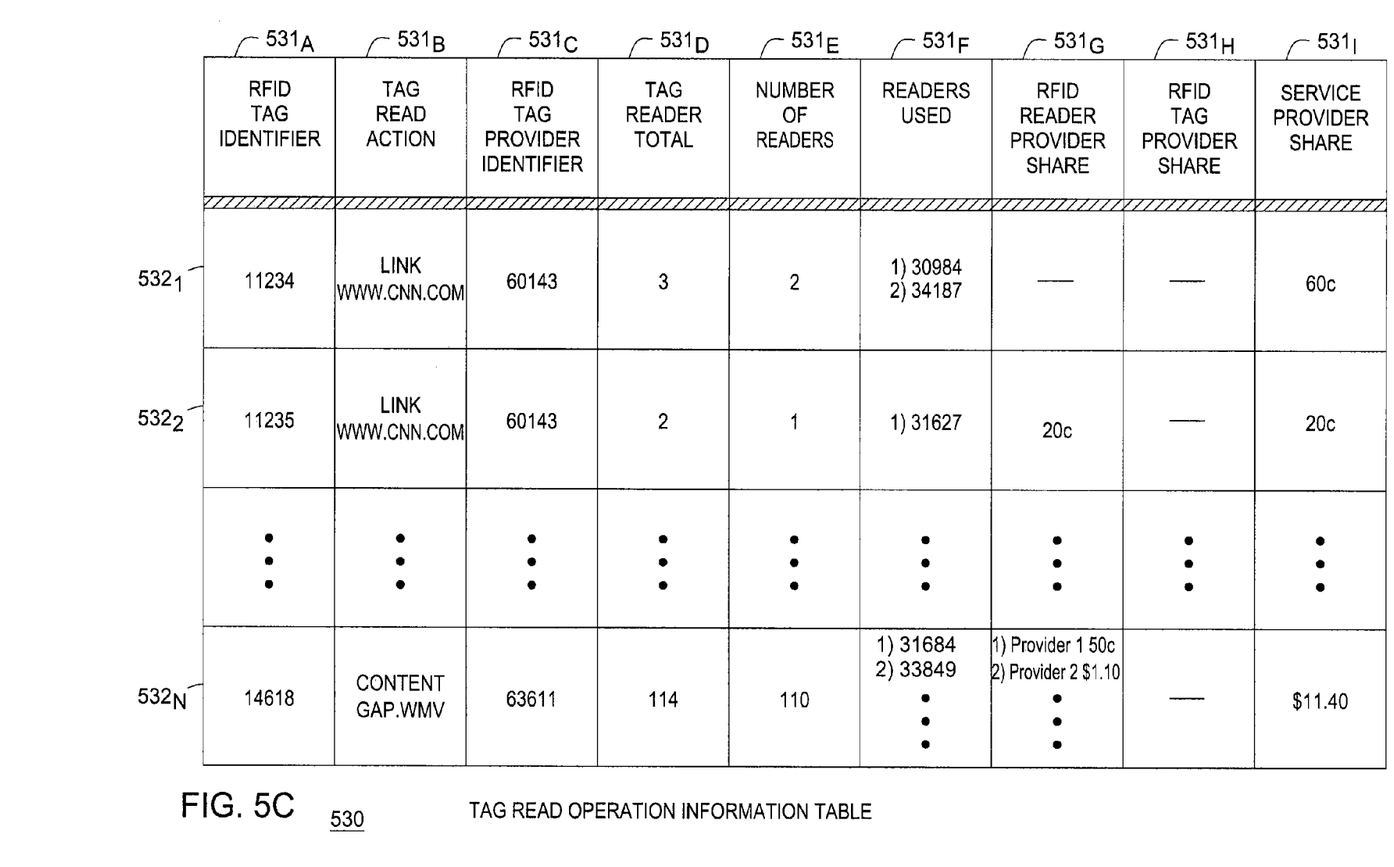

FIGS. 5A-5C depict exemplary database tables for storing RFID registration information, initiating business logic and determining revenue sharing in response to an RFID tag being read by an RFID reader, and maintaining information associated with reading of RFID tags by RFID readers.

FIG. 5A depicts an exemplary RFID reader registration information table 510. As depicted in FIG. 5A, RFID reader registration information table 510 includes a plurality of columns $511_A$-$511_F$ (collectively, columns 511) and a plurality of rows $512_1$-$512_N$ (collectively, rows 512). The columns 511 correspond to types of information that may be stored for each RFID reader for which RFID reader registration information is stored (illustratively, column $511_A$ is an RFID reader identifier column, column $511_B$ is an RFID reader provider name column, column $511_C$ is an RFID reader provider identifier column, column $511_D$ is a registered users column, column $511_E$ is a date of registration column, and column $511_F$ is a limitations on use column). The rows 512 correspond to RFID readers for which RFID reader registration information is stored. Although the RFID reader registration information is depicted and described as being stored in a specific manner, it will be appreciated that the RFID reader registration information may be stored in various other ways (e.g., using columns arranged in a different manner, different numbers of columns, different numbers of tables, different types of information, and the like, as well as various combinations thereof).

FIG. 5B depicts an exemplary RFID tag registration information table 520. As depicted in FIG. 5B, RFID tag registration information table 520 includes a plurality of columns $521_A$-$521_G$ (collectively, columns 521) and a plurality of rows $522_1$-$522_N$ (collectively, rows 522). The columns 521 correspond to types of information that may be stored for each RFID tag for which RFID tag registration information is stored (illustratively, column $521_A$ is an RFID tag identifier column, column $521_B$ is an RFID tag provider name column, column $521_C$ is an RFID tag provider identifier column, column $521_D$ is a registered users column, column $521_E$ is a date of registration column, column $521_F$ is a limitations on use column, and column $521_G$ is a business logic column). The rows 522 correspond to RFID tags for which RFID tag registration information is stored. Although the RFID tag registration information is depicted and described as being stored in a specific manner, it will be appreciated that the RFID tag registration information may be stored in various other ways (e.g., using columns arranged in a different manner, different numbers of columns, different numbers of tables, different types of information, and the like, as well as various combinations thereof).

FIG. 5C depicts an exemplary tag read operation information table 530. The tag read operation information table 530 may be populated using information from RFID reader registration information table 510 and RFID tag registration information table 520, as well as information which may be included in tag read requests, information used to determine tag read responses (e.g., business logic and other similar information), information included in tag read responses, information used to determine revenue sharing, information maintained in response to revenue sharing determinations, and the like, as well as various combinations thereof).

As depicted in FIG. 5C, tag read operation information table 530 includes a plurality of columns $531_A$-$531_I$ (collectively, columns 531) and a plurality of rows $532_1$-$532_N$ (collectively, rows 532). The columns 531 correspond to types of information that may be stored for each RFID tag that is read (illustratively, column $531_A$ is an RFID tag identifier column, column $531_B$ is a tag read operation column, column $531_C$ is an RFID tag provider identifier column, column $531_D$ is a tag read total column, column $531_E$ is a number of readers column, column $531_F$ is a readers used column, column $531_G$ is an RFID reader provider revenue share column, column $531_H$ is an RFID tag provider revenue share column, and column $531_I$ is a service provider revenue share column). The rows 532 correspond to RFID tags which have been read and, thus, for which tag read operation information is stored. Although specific numbers of columns including specific types of information are depicted in a specific format, RFID tag registration information may be stored using different numbers of tables, different types of information, different organization of information, and the like.

As an example, consider the first row $532_1$ of tag read operation information table 530. This first row $532_1$ indicates that the RFID tag having RFID tag identifier number 11234 has been read a certain number of times since being registered. The first row $532_1$ may be added to tag read operation information table 530 the first time that the RFID tag having RFID tag identifier number 11234 is read, and at least a portion of the information in first row $532_1$ may be updated each time the RFID tag having RFID tag identifier number 11234 is read.

The columns $531_A$-$531_C$ may be populated the first time an RFID tag is read.

The RFID tag identifier column $531_A$ indicates the identifier of the RFID tag that has been read.

The tag read action column $531_B$ indicates the tag read action(s) that is performed in response to that RFID tag being read.

The RFID tag provider identifier column $531_C$ indicates the identifier of the RFID tag provider that provided the RFID tag that has been read.

In continuation of the example in which first row $532_1$ of tag read operation information table 530 is considered, RFID tag identifier column $531_A$ indicates that the RFID tag identifier of the RFID tag that has been read is 11234, tag read action column $531_B$ indicates that the tag read action that is performed in response to that RFID tag being read is that the user device associated with the RFID reader used to read the tag is directed to a website (namely, www.cnn.com), and the RFID tag provider identifier column $531_C$ indicates the RFID tag was registered by the RFID tag provider having RFID tag provider identifier number 60143.

The first three columns $531_A$-$531_C$ are populated once (namely, when the first row $532_1$ is added to tag read operation information table 530). The first three columns $531_A$-$531_C$ may be populated using information included within the first tag read request received for RFID tag identifier 11234 and/or information associated RFID tag identifier 11234 that is stored in RFID tag registration information table 520.

The columns $531_D$-$531_I$ in tag read operation information table 530 (or at least a portion thereof) may be populated the first time an RFID tag is read and updated each subsequent time an RFID tag is read.

The tag read total column $531_D$ indicates the number of times the RFID tag has been read, and, thus, is incremented each time the RFID tag is read.

The number of readers column $531_E$ indicates the number of different RFID readers that have been used to read the RFID tag, and, thus, is incremented each time a different RFID reader is used to read the RFID tag.

The readers used column $531_F$ indicates which RFID readers (e.g., identified by respective RFID reader identifiers) have been used to read the RFID tag, and, thus, is updated each time a different RFID reader is used to read the RFID tag.

The RFID reader provider share column $531_G$ indicates the share of revenue due to each RFID reader provider based on use of RFID readers of the RFID reader providers to read the RFID tag, and, thus, may be updated each time the RFID tag is read (e.g., depending on whether or not the RFID reader provider is entitled to any revenue sharing in that instance). The values in RFID reader provider share column $531_G$ may be determined by using the RFID tag identifier as a key into the RFID tag registration information table 520 in order to determine whether or not the RFID reader provider is entitled to revenue sharing (e.g., using business logic column $521_G$), and using the RFID reader identifier as a key into the RFID reader registration information table 510 in order to identify the RFID provider associated with the RFID reader used to read the tag so that any applicable revenue sharing may be applied to that RFID reader provider.

The RFID tag provider share column $531_H$ indicates the share of revenue due to the RFID tag provider of the RFID tag, and, thus, may be updated each time the RFID tag is read (e.g., depending on whether or not the RFID tag provider is entitled to any revenue sharing in that instance). The values in RFID reader provider share column $531_H$ may be determined by using the RFID tag identifier as a key into the RFID tag registration information table 520 in order to determine whether or not the RFID tag provider is entitled to revenue sharing so that any applicable revenue sharing may be applied to that RFID tag provider.

The service provider share column $531_I$ indicates the share of revenue due to the RFID service provider that supports processing of the tag read operation, and, thus, may be updated each time the RFID tag is read (e.g., depending on whether or not the RFID service provider is entitled to any revenue sharing in that instance). The values in RFID reader provider share column $531_I$ may be determined by using the RFID tag identifier as a key into the RFID tag registration information table 520 in order to determine whether or not the RFID service provider is entitled to revenue sharing so that any applicable revenue sharing may be applied to that RFID service provider.

In continuation of the example in which first row $532_1$ of tag read operation information table 530 is considered, RFID tag 11234 has been read a total of three times, by two different RFID readers (RFID reader 30984 and RFID reader 34187). As indicated in the revenue sharing columns $531_G$, $531_H$, and $531_I$, only the RFID service provider receives revenue sharing when RFID tag 11234 is read. In this example, from the intersection of row $522_1$ (associated with RFID tag 11234) and column $521_G$ in RFID tag registration information table 520, a determination may be made that the RFID service provider is to receive 20 cents of revenue sharing each time RFID tag 11234 is read. As such, since RFID tag 11234 has been read three times, the service provider share column $531_I$ indicates that the RFID service provider has earned 60 cents thus far for providing service each time RFID tag 11234 is read.

As another example, consider the last row $532_N$ of tag read operation information table 530. This last row $532_N$ indicates that the RFID tag having RFID tag identifier number 14618 has been read 114 times since being registered (by 110 different RFID readers). For example, RFID tag 14618 may be embedded within a poster hanging in a store in a mall (e.g., at The Gap), embedded within a magazine in a doctor's office, or associated with any other object which may tend to produce a large number of tag read operations. As indicated in the revenue sharing columns $531_G$, $531_H$, and $531_I$, at least some of the RFID reader providers receive revenue sharing when RFID tag 14618 is read. Similarly, the RFID service provider receives revenue sharing when RFID tag 14618 is read. In this example, from RFID tag registration information table 520, a determination may be made as to the amount of revenue sharing due to each RFID reader provider and the RFID service provider each time RFID tag 14618 is read.

In this manner, various cross-media advertisement scenarios may be supported in which users use RFID readers provided by various RFID reader providers to read RFID tags provided by various RFID tag providers.

As an example, a user may use an RFID reader that he purchased at Wal-Mart to read an RFID tag embedded in a Sears catalogue, thereby directing the user to the Sears website in order to place an order for a product advertised in the catalogue. This may result in revenue being provided to Wal-Mart for supplying the RFID reader that enabled the user to be directed to the Sears website to purchase the product. This may also result in revenue being provided to Alcatel-Lucent for providing the service which enabled the tag read operation to be completed.

As another example, a user may use an RFID reader embedded his cellular phone that he received from his wireless service provider to read an RFID tag embedded in a poster at a movie theater for an upcoming movie due to be released, thereby causing a movie trailer to be streamed to the cellular phone to be played by the user. This may result in revenue being provided to the wireless service provider for supplying the RFID reader that enabled the user to be directed to the website to view the movie trailer. This may also result in revenue being provided to Alcatel-Lucent for providing the service which enabled the tag read operation to be completed.

From the examples described herein, it may be seen that the functions depicted and described herein stimulate the uptake of RFID readers and the distribution of RFID tags, promote advertising, result in additional revenue generation, and provide various other benefits.

Although primarily depicted and described herein within the context of a system using RFID technology, the present invention may be implemented using other similar technologies, such as Near Field Communication (NFC) technology, barcode technology (e.g., 1D and 2D), and the like, as well as various combinations thereof. For example, where NFC technology is employed, references herein to RFID readers and RFID tags may be read as NFC reader devices and NFC code devices, respectively. Similarly, for example, where Barcode Technology is employed, references herein to RFID readers and RFID tags may be read as bar code readers and bar codes, respectively. Accordingly, RFID readers, bar code readers, and the like may be more generally referred to as object code readers; RFID tags, bar codes, and the like may be more generally referred to as object codes; and, further, other related terms may be adapted accordingly.

Figure 6:
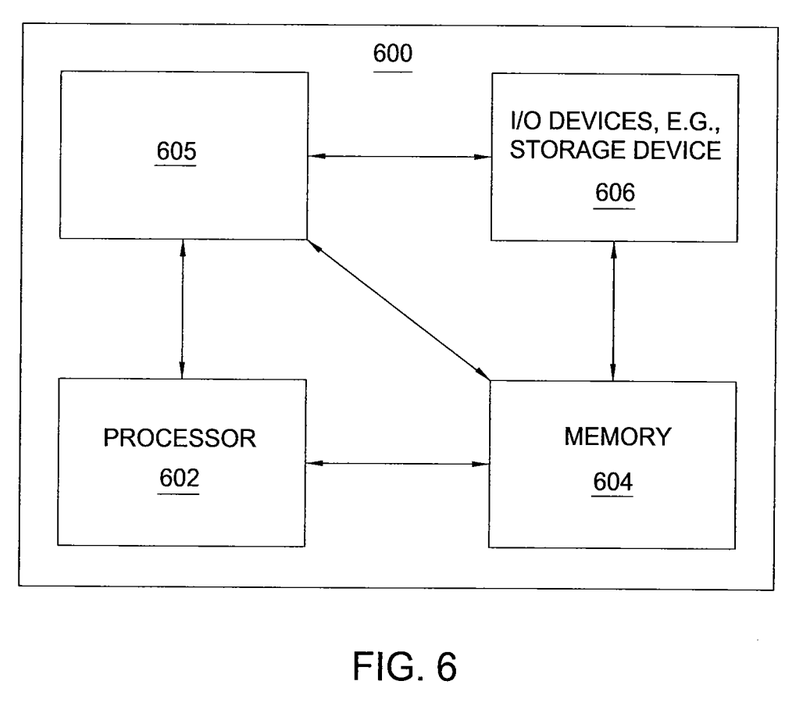
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), an RFID read operation control module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, a speaker, and the like)).

It should be noted that the present invention may be implemented in software and/or in a combination of software and hardware, e.g., using application specific integrated circuits (ASIC), a general purpose computer or any other hardware equivalents. In one embodiment, the present RFID read operation control module process 605 can be loaded into memory 604 and executed by processor 602 to implement the functions as discussed hereinabove. As such, RFID read operation control module process 605 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method, comprising:
using a processor for:
receiving an object code read request from a user device, the object code read request indicative that an object code has been read using an object code reader;
determining at least one of a provider of the object code read using the object code reader and a provider of the object code reader used to read the object code; and
determining revenue sharing for the object code read request based on the determined at least one of the provider of the object code and the provider of the object code reader.

2. The method of claim 1, wherein determining the provider of the object code comprises:
searching object code registration information using an object code identifier associated with the object code read request.

3. The method of claim 1, wherein determining the provider of the object code reader comprises:
searching object code reader registration information using an object code reader identifier associated with the object code read request.

4. The method of claim 1, wherein revenue sharing is determined using both the provider of the object code and the provider of the object code reader.

5. The method of claim 1, wherein determining revenue sharing comprises:
determining business logic associated with the object code; and
determining revenue sharing using the business logic.

6. The method of claim 5, wherein determining revenue sharing comprises:
determining an amount of revenue to be credited to the provider of the object code.

7. The method of claim 5, wherein determining revenue sharing comprises:
determining an amount of revenue to be credited to the provider of the object code reader.

8. The method of claim 1, wherein determining revenue sharing further comprises:
determining a service provider servicing the object code read request; and
determining an amount of revenue to be credited to the service provider.

9. The method of claim 1, further comprising:
determining an action to be performed based on at least one of the object code read and the object code reader used to read the object code; and
propagating, toward the user device, an object code read response based on the action to be performed.

10. The method of claim 9, wherein the action to be performed comprises at least one of:
propagating, toward the user device, a message adapted for directing the user device to a website; and
propagating content toward the user device.

11. A method for responding to an object code read request, comprising:
using a processor for:
receiving an object code read request from a user device, the object code read request identifying an object code read and an object code reader used to read the object code;
determining an action to be performed based on at least one of a provider of the object code read and a provider of the object code reader used to read the object code; and
propagating, toward the user device, an object code read response based on the action to be performed.

12. The method of claim 11, wherein determining the action to be performed comprises:
determining a provider of the object code using an identifier of the object code and object code registration information; and
determining a provider of the object code reader using an identifier of the object code reader and object code reader registration information.

13. The method of claim 11, wherein the action to be performed comprises at least one of:
propagating, toward the user device, a message adapted for directing the user device to a website; and
propagating content toward the user device.

14. The method of claim 11, further comprising:
determining revenue sharing for the object code read request.

15. The method of claim 14, wherein revenue sharing is based on at least one of the object code that was read, a provider of the object code that was read, the object code reader used to read the object code, and a provider of the object code reader used to read the object code.

16. A method for processing an object code read request, comprising:
using a processor for:
receiving object code reader registration information from at least one provider of object code readers;
receiving object code registration information from at least one provider of object codes; and
processing an object code read request from a user device using the object code reader registration information and the object code registration information, wherein processing the object code read request from the user device comprises determining revenue sharing for the object code read request.

17. The method of claim 16, wherein processing the object code read request from the user device comprises:
determining an action to be performed in response to the object code read request.

18. The method of claim 17, wherein the action to be performed comprises at least one of:
propagating, toward the user device, a message adapted for directing the user device to a website; and
propagating content toward the user device.

19. The method of claim 16, wherein revenue sharing is based on at least one of the object code that was read, a provider of the object code that was read, the object code reader used to read the object code, and a provider of the object code reader used to read the object code.

20. An apparatus, comprising:
at least one communication interface adapted for communicating with a plurality of object code reader provider systems, a plurality of object code provider systems, and a plurality of user devices having object code readers associated therewith;
a processor adapted for processing object code reader registration requests received from the object code reader provider systems, processing object code registration requests received from the object code provider system, and processing object code read requests from user devices; and
a memory adapted for storing object code reader registration information received in the object code reader registration requests, storing object code registration information received in the object code registration requests, and storing logic adapted for use in processing the object code read requests from the user devices.

21. An apparatus, comprising:

a processor and a memory communicatively connected to the processor, the processor configured to:

receive an object code read request from a user device, the object code read request indicative that an object code has been read using an object code reader;

determine at least one of a provider of the object code read using the object code reader and a provider of the object code reader used to read the object code; and determine revenue sharing for the object code read request based on the determined at least one of the provider of the object code and the provider of the object code reader.

22. An apparatus, comprising:

a processor and a memory communicatively connected to the processor, the processor configured to:

receive an object code read request from a user device, the object code read request identifying an object code read and an object code reader used to read the object code;

determine an action to be performed based on at least one of a provider of the object code read and a provider of the object code reader used to read the object code; and propagate, toward the user device, an object code read response based on the action to be performed.

23. An apparatus, comprising:

a processor and a memory communicatively connected to the processor, the processor configured to:

receive object code reader registration information from at least one provider of object code readers;

receive object code registration information from at least one provider of object codes; and process an object code read request from a user device using the object code reader registration information and the object code registration information, wherein processing the object code read request from the user device comprises determining revenue sharing for the object code read request.

\* \* \* \* \*